No. 805,101. PATENTED NOV. 21, 1905.
H. H. SPONENBURG.
RAILROAD RAIL STAY.
APPLICATION FILED AUG. 28, 1905.
5 SHEETS—SHEET 3.
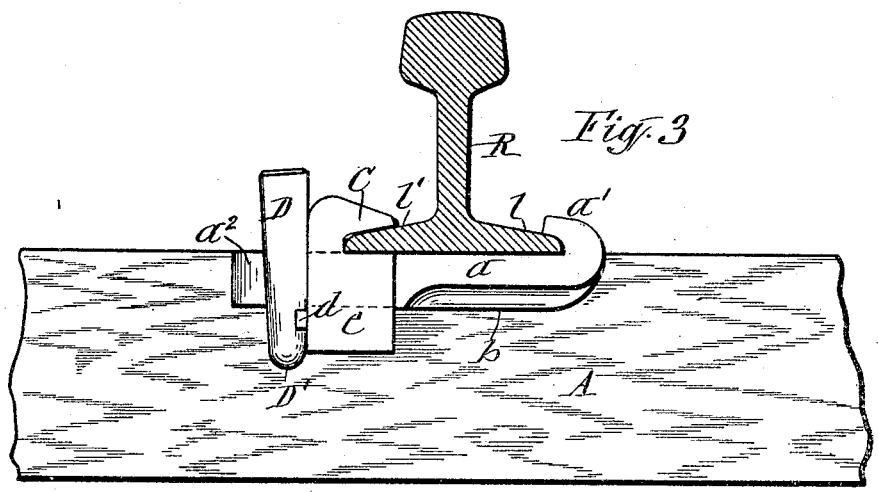
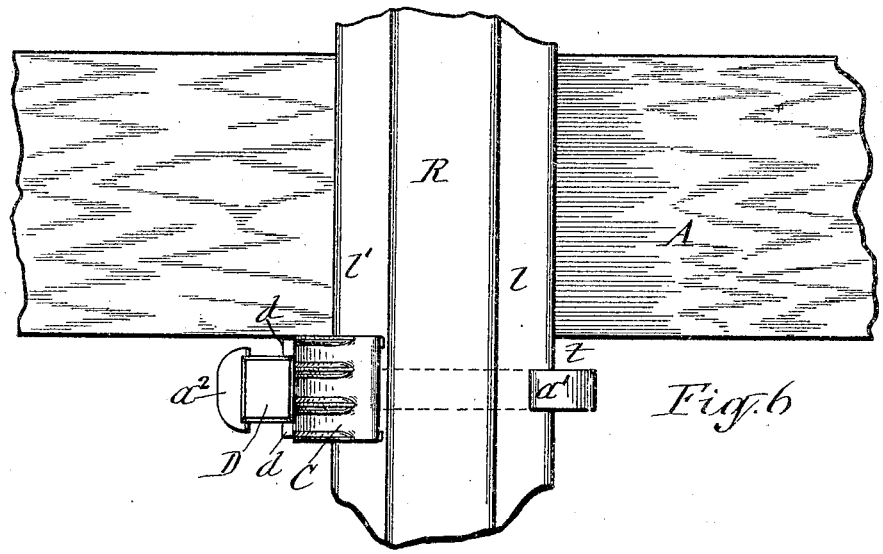
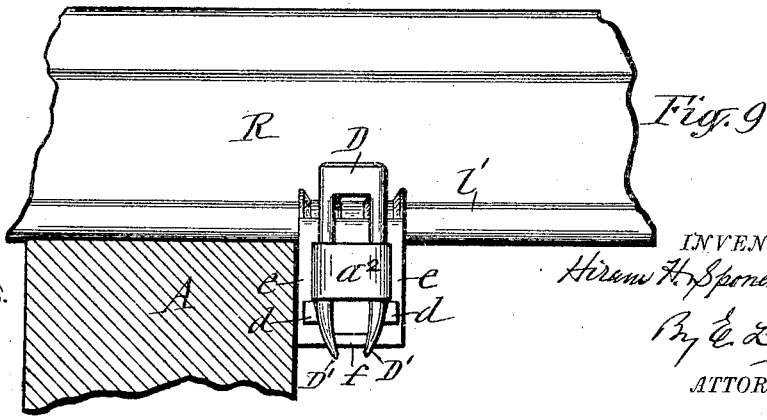
WITNESSES:
INVENTOR:
Hiram H. Sponenburg
By E. Laas
ATTORNEY.

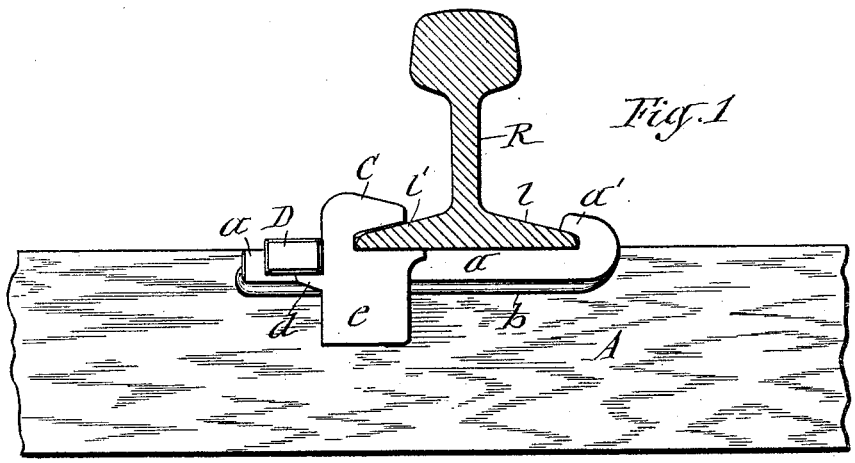
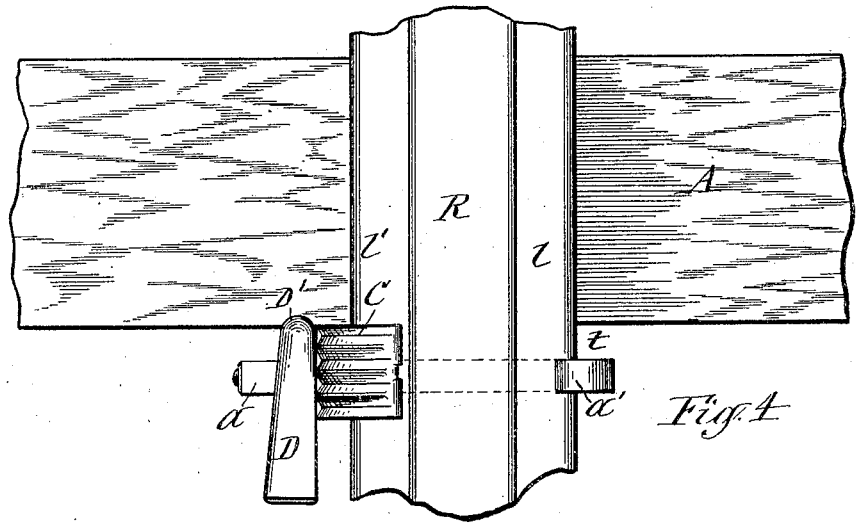
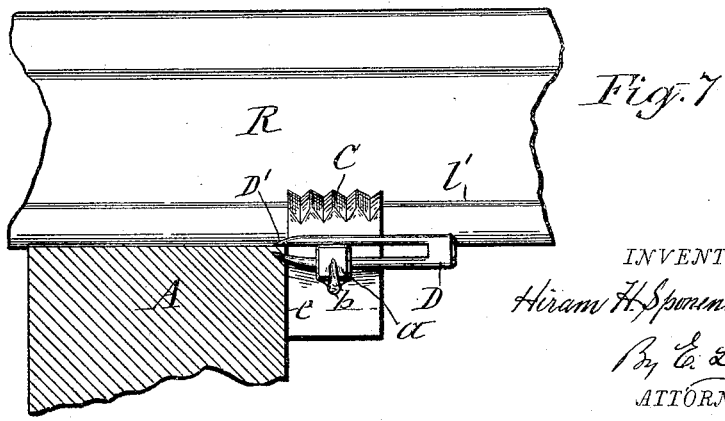

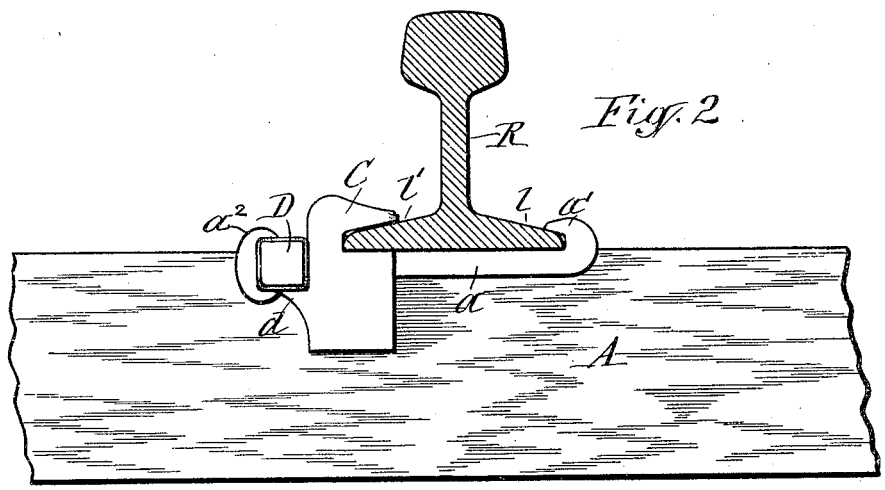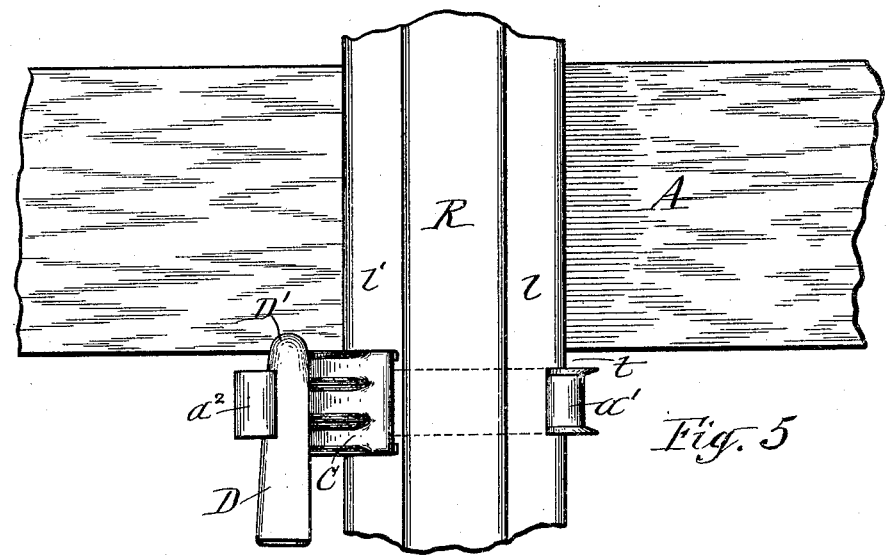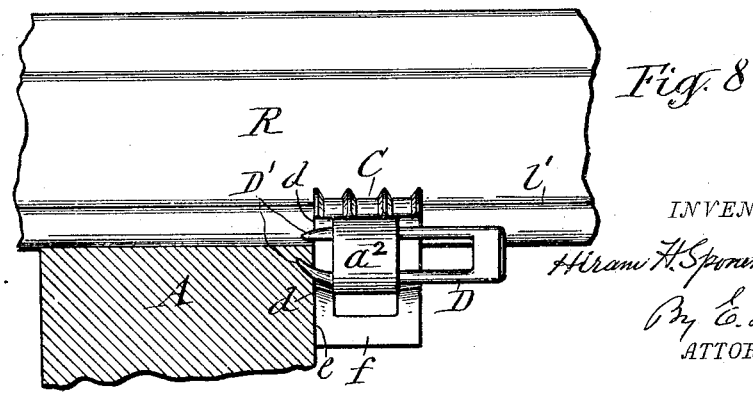

No. 805,101. PATENTED NOV. 21, 1905.
H. H. SPONENBURG.
RAILROAD RAIL STAY.
APPLICATION FILED AUG. 28, 1905.

5 SHEETS—SHEET 4.

WITNESSES:

INVENTOR
Hiram H. Sponenburg
By E. Laass
ATTORNEY.

No. 805,101. PATENTED NOV. 21, 1905.
H. H. SPONENBURG.
RAILROAD RAIL STAY.
APPLICATION FILED AUG. 28, 1905.
5 SHEETS—SHEET 5.
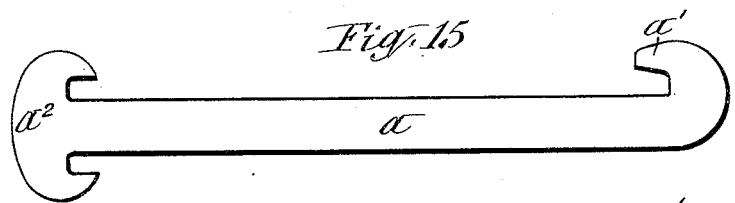
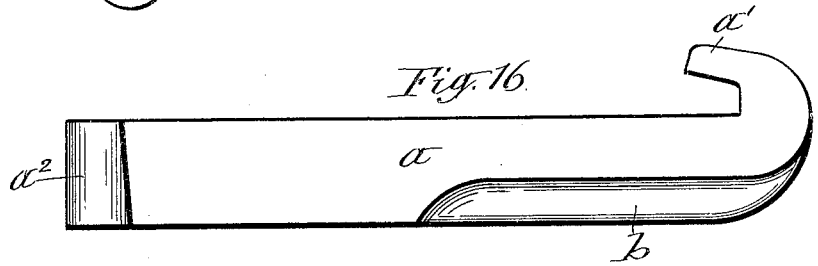
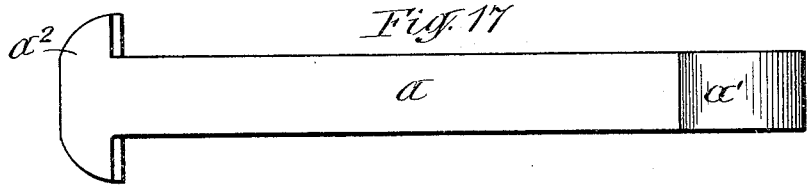
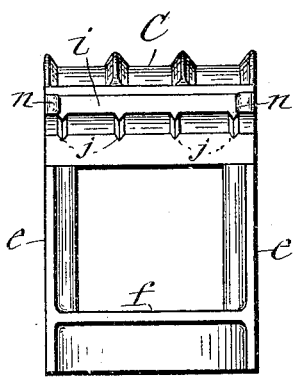
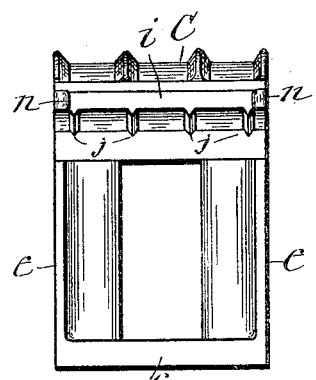
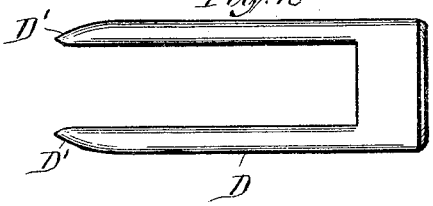
WITNESSES:
INVENTOR
Hiram H. Sponenburg
By E. Laass
ATTORNEY.

UNITED STATES PATENT OFFICE.

HIRAM H. SPONENBURG, OF WADSWORTH, ILLINOIS, ASSIGNOR OF ONE-HALF TO EDWARD LAAS, OF OTTUMWA, IOWA.

RAILROAD-RAIL STAY.

No. 805,101.          Specification of Letters Patent.          Patented Nov. 21, 1905.

Application filed August 28, 1905. Serial No. 276,027.

*To all whom it may concern:*

Be it known that I, HIRAM H. SPONENBURG, a citizen of the United States, and a resident of Wadsworth, in the county of Lake, in the State of Illinois, have invented new and useful Improvements in Railway-Rail Stays, of which the following, taken in connection with the accompanying drawings, is a full, clear, and exact description.

This invention relates to the class of railway-stays which are designed to prevent longitudinal creeping of the rail.

The object of the invention is to provide a rail stay or anchor which shall be simple and inexpensive to manufacture and capable of obtaining a firm and reliable hold upon the rail and transmit the longitudinal strain of the rail to the subjacent cross-tie which supports the rail on the road-bed; and to that end the invention consists in the novel construction and combination of the component parts of the rail-stay, as hereinafter described, and set forth in the appended claims.

Figure 10:
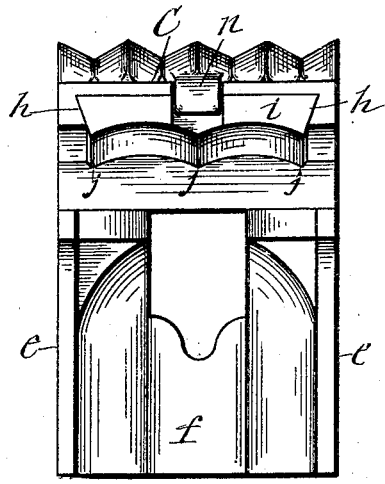
Figure 11:
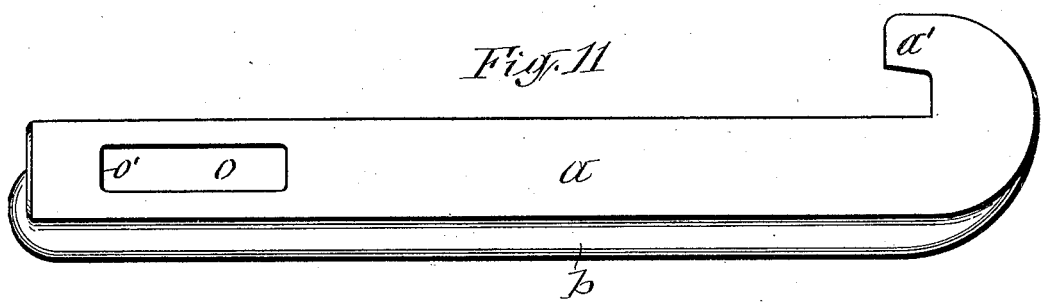
Figure 12:
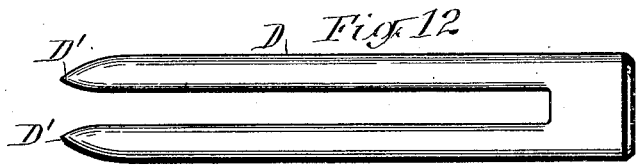
Figure 14:
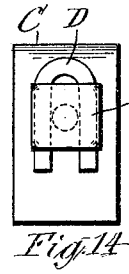
Figure 13:
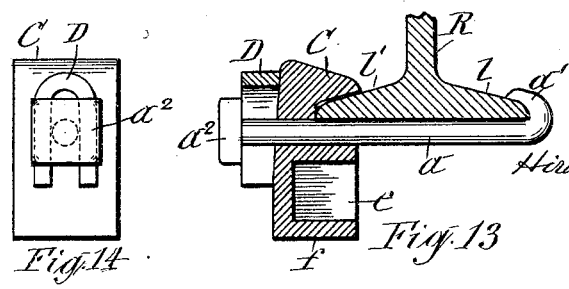

In the accompanying drawings, Figures 1, 2, and 3 are transverse sections of a rail equipped with an improved rail-stay, modified in some of its details. Figs. 4, 5, and 6 are plan views of the same. Figs. 7, 8, and 9 are side views of the rail with the rail-stay applied thereto and embodying the aforesaid details. Fig. 10 is an enlarged detached view of the inner side of the movable jaw shown in Figs. 1, 4, and 7. Fig. 11 is an enlarged detached side view of the transverse bar adapted for the last-mentioned movable jaw. Fig. 12 is a detached side view of the wedge employed for setting the movable jaw into position for firmly gripping the rail. Fig. 13 is a transverse section of a further modification of the rail-stay. Fig. 14 is an outer face view of the same. Figs. 15 and 16 are enlarged side views of the cross-bar formed with heads for operating, respectively, on wedges disposed horizontally and on wedges placed vertically on the bar. Fig. 17 is a plan view of the bar shown in Fig. 16. Fig. 18 is a side view of a wedge designed for the said cross-bars. Figs. 19 and 20 are inner side views of jaws designed, respectively, for the cross-bars shown in Figs. 15, 16, and 17.

Similar letters of reference indicate corresponding parts.

R denotes the rail, and A the cross-tie, which supports said rail on the road-bed in the usual and well-known manner.

The essential features of the invention consist in the combination, with the rail and subjacent supporting cross-tie, of jaws disposed to grip the flanges of the rail, a wedge forcing the jaws to the rail, and means for sustaining said jaws on the cross-tie. These features are embodied in the following construction and combination of elements.

$a$ represents a stout metal bar which is placed across the bottom of the rail R and is provided on one end with a fixed jaw $a'$, preferably formed integral with the bar and adapted to grip the flange on one side of the rail. The opposite end of said bar is provided with an abutting head for the wedge D, hereinafter described. Said head may consist either of the outer end wall $o'$ of a longitudinal slot $o$, as shown in Fig. 11 of the drawings, into which slot the aforesaid wedge is inserted, as shown in Figs. 1, 4, and 7 of the drawings, or the said head may be formed of an enlargement of the end of the bar, so as to project either at the top and bottom of the bar, as shown in Figs. 2, 5, 8, and 15, or from the sides of the bar, as represented in Figs. 3, 6, 9, 13, 16, and 17 of the drawings. I preferably reinforce the bar $a$ by means of one or more ribs $b$, extending lengthwise of the bar.

C represents the movable jaw which straddles the headed end of the bar. Between the back of this jaw and the head of the bar is inserted the wedge D, which I preferably bifurcate and taper the ends of the prongs thereof, as shown at D'. By driving the wedge from the large end thereof it is caused to force the jaw C to the rail R, so as to firmly grip the flange $l'$ on the adjacent side of the rail and at the same time draw the jaw $a'$ into firmly-gripping position on the flange $l$.

When the aforesaid head is formed of the outer end wall $o'$ of the slot $o$ in the bar $a$, only one of the wedge-prongs is inserted into said slot. Inasmuch as either of the two prongs may be used, the wedge D is applicable to a rail-stay applied to either side of the track. When the head of the bar consists of an enlargement of the end of the bar, as shown at $a^2$, the bifurcated wedge is placed astride the portion of the bar $a$ between the said head and back of the movable jaw C and is to be placed either vertically to engage the side projections of the head, as shown in Figs. 3, 6, and 9 of the drawings, or horizontally to engage top and bottom projections of the head, as shown in Figs. 2, 5, and 8 of the drawings. When the bar $a$ consists of a cylindrical rod formed with a square head $a^2$, as illustrated in Figs. 13 and 14 of the drawings, the bifurcated wedge D may be placed either vertically or horizontally, as may be desired.

To prevent the wedge from accidentally working loose from its engaged position, I form the back of the jaw C with projecting lugs $d$, which are beveled and disposed to press on one of the flat sides of the protruding tapered end or ends of the wedge, and thereby bend or deflect the same while driving the wedge into position to force the jaw C to the rail R. Said deflection prevents withdrawal of the wedge.

The jaw C projects over the sides of the bar $a$ and is formed with depending flanges $e$ on its sides, by one of which flanges the rail-stay abuts against the side of the cross-tie A to prevent longitudinal creeping of the rail R. The aforesaid projection causes the abutment of the flange $e$ to hold the bar $a$ out of contact with the side of the tie A, as shown at $t$ in Figs. 4, 5, and 6 of the drawings, and thus allows said bar to be forced into an oblique position by excessive strain exerted on the abutting flange $e$ of the jaw C. Said movement of the bar $a$ causes the two jaws $a'$ and C to more firmly grip the rail. A cross-bar $f$ unites the lower ends of the said flanges to brace them.

To enable the jaw C to obtain a more secure hold on the flange of the rail, I form the inner face of the said jaw with a recess $h$ and place therein a plate $i$ of hard metal, preferably case-hardened, which plate is formed with sharp ribs $j\ j$, disposed parallel with the bar $a$, so as to cause the said ribs to cut into the flange of the rail during the operation of driving the wedge D to force the jaw C to the rail. Said plate is retained in the recess $h$ by the interlocking dovetailed joint at the edges of the plate and correspondingly undercut sides of the recess and by a lip $n$ on the jaw clenched onto the edge of the plate, as shown in Figs. 10, 19, and 20 of the drawings.

What I claim as my invention is—

1. The combination, with the rail and subjacent cross-tie, of jaws disposed to grip the flanges of the rail, a wedge disposed to force the jaws to the rail and means for engaging said jaws with the cross-tie.

2. A rail-stay comprising a bar extending across the bottom of the rail, jaws carried on opposite ends of said bar, a wedge forcing said jaws into position to grip the base of the rail, and means for engaging said jaws with the cross-tie as set forth.

3. A rail-stay comprising a bar extending across the bottom of the rail, a jaw sustained on one end of said bar, a jaw mounted on the opposite end of said bar movably toward the rail, and a wedge applied to said bar and forcing the jaws into gripping position on the rail.

4. A rail-stay comprising a bar extending across the bottom of the rail and provided with a fixed jaw on one end and headed on the opposite end, a jaw mounted movably on the headed end of said bar, and a wedge inserted between the head of the bar and the back of the movable jaw.

5. A rail-stay comprising a bar extending across the bottom of the rail and provided with a fixed jaw on one end and with a head on the opposite end of the bar, a hard-metal plate attached to the inner face of the movable jaw and provided with rail-gripping ribs disposed parallel with the aforesaid bar, and a wedge inserted between the head of the bar and the back of the movable jaw as set forth.

6. A rail-stay consisting of a bar extending across the bottom of the rail and formed with a jaw on one of its ends and with a head on the opposite end, a movable jaw straddling the headed end of the bar and a wedge inserted between the head of the bar and the back of the movable jaw.

7. A rail-stay consisting of a bar extending across the bottom of the rail and provided with a reinforcing-rib extending lengthwise of the bar and with a fixed jaw on the one end and a head on the opposite end, a movable jaw straddling the headed end of the bar and provided with a fixed depending flange abutting on the side of the cross-tie, and a wedge inserted between the head of the bar and the back of the movable jaw as set forth.

8. A rail-stay consisting of a bar extending across the bottom of the rail and provided with a fixed jaw on one end, a movable jaw mounted on the opposite end of the bar and formed with a depending flange projecting over the side of the bar and engaging the cross-tie, and means applied to the bar to force the movable jaw to its gripping position on the rail.

9. A rail-stay consisting of a bar extending across the bottom of the rail and provided with a fixed jaw on one end and with a head on the opposite end, a movable jaw straddling the headed end of the bar and formed with a depending flange projecting laterally over the side of the bar and engaging the cross-tie, and a wedge inserted between the head of the bar and back of the movable jaw as set forth.

10. A rail-stay consisting of a bar extending across the bottom of the rail and provided with a fixed jaw on one end and with a head on the opposite end, a movable jaw straddling the opposite end of the bar, a wedge inserted between the head of the bar and the back of the jaw, and a lug projecting from the movable jaw and disposed to deflect the protruding end of the wedge as and for the purpose set forth.

11. The combination with the transverse bar formed at one end with a rail-gripping jaw and at the opposite end with a head, and a movable jaw mounted on the headed end of the bar, of the bifurcated wedge straddling the bar between the head thereof and the back of the movable jaw and having the ends of its prongs tapered, and lugs projecting from the back of the movable jaw and disposed to deflect the protruding tapered ends of the wedge-prongs as set forth.

12. A rail-stay consisting of a bar extending across the bottom of the rail and formed at one end with a jaw and at the opposite end with a head, a movable jaw straddling the headed end of the bar and formed with depending flanges on opposite sides and with a recess in the interior of the jaw, a hard-metal plate seated in said recess and provided with ribs disposed parallel with the aforesaid bar, a bifurcated wedge straddling the headed end of the bar and having the ends of its prongs tapered, and lugs projecting from the back of the movable jaw and disposed to deflect the tapered ends of the wedge-prongs, substantially as set forth.

HIRAM H. SPONENBURG. [L. S.]

Witnesses:
 JOHN E. REARDON,
 WILLIAM C. UPTON.